(No Model.) 3 Sheets—Sheet 1.

J. L. & P. C. McCREARY.
HAY LOADER.

No. 513,410. Patented Jan. 23, 1894.

Witnesses
F. M. Johnson
D. C. Walkaupter

Inventors
John L. McCreary and
Parker C. McCreary
By their Attorneys,
C. A. Snow & Co.

(No Model.)  3 Sheets—Sheet 2.

J. L. & P. C. McCREARY.
HAY LOADER.

No. 513,410.  Patented Jan. 23, 1894.

Witnesses
F. M. Johnson
L. C. Wolhaupter

Inventor
John L. McCreary
Parker C. McCreary
By their Attorneys,
C. A. Snow & Co.

THE NATIONAL LITHOGRAPHING COMPANY,
WASHINGTON, D. C.

(No Model.) 3 Sheets—Sheet 3.

J. L. & P. C. McCREARY.
HAY LOADER.

No. 513,410. Patented Jan. 23, 1894.

Witnesses  
F. M. Johnson  
D. P. Wolhaupter

By their Attorneys,  
C. A. Snow & Co.

Inventors  
John L. McCreary and  
Parker C. McCreary

UNITED STATES PATENT OFFICE.

JOHN L. McCREARY AND PARKER C. McCREARY, OF LAMAR, MISSOURI.

HAY-LOADER.

SPECIFICATION forming part of Letters Patent No. 513,410, dated January 23, 1894.

Application filed March 27, 1893. Serial No. 467,871. (No model.)

*To all whom it may concern:*

Be it known that we, JOHN L. MCCREARY and PARKER C. MCCREARY, citizens of the United States, residing at Lamar, in the county of Barton and State of Missouri, have invented a new and useful Hay-Loader, of which the following is a specification.

This invention relates to hay loaders; and it has for its object to provide certain improvements in machines of this character whereby efficient means will be provided for either swath or windrow loading.

To this end the main and primary object of the invention is to provide an improved hay loading machine, comparatively simple in construction while at the same time especially efficient in operation for either of the uses noted.

With these and many other objects in view which will readily appear as the nature of the invention is better understood, the same consists in the novel construction, combination and arrangement of parts, hereinafter more fully described, illustrated and claimed.

Figures 1, 7:
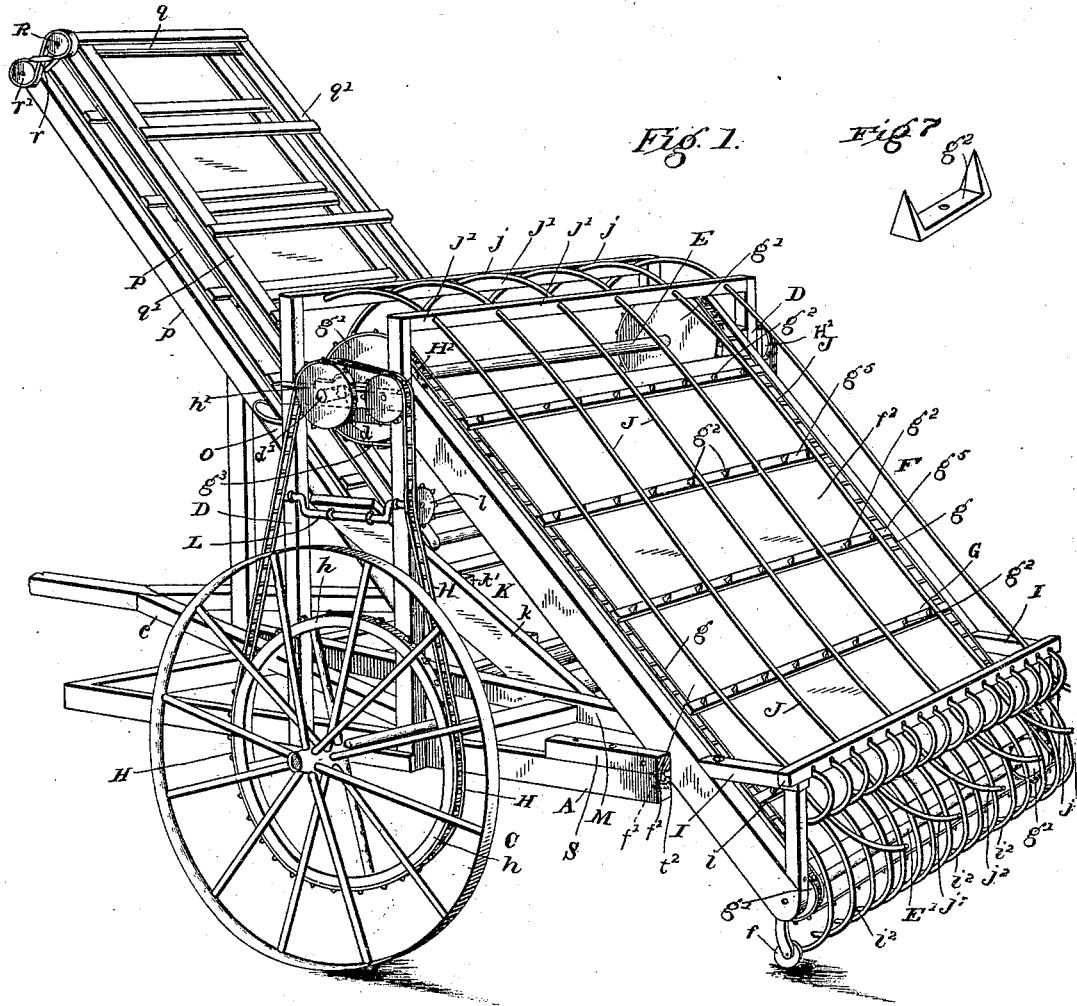
Figure 6:
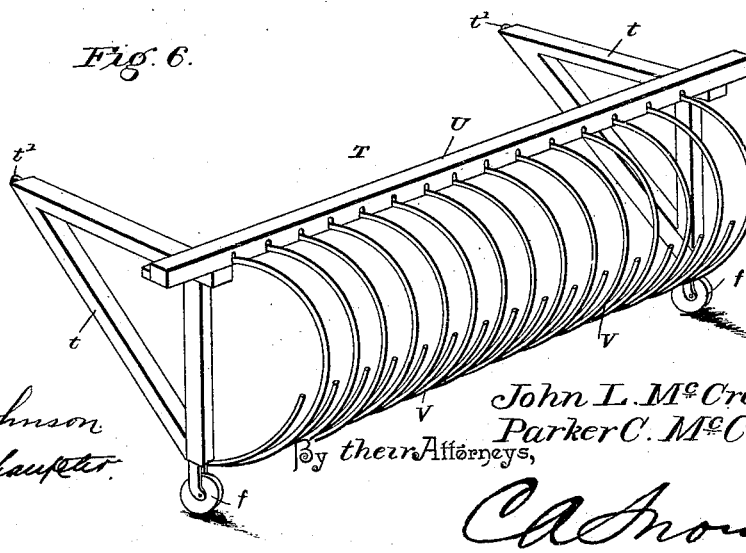
Figure 2:
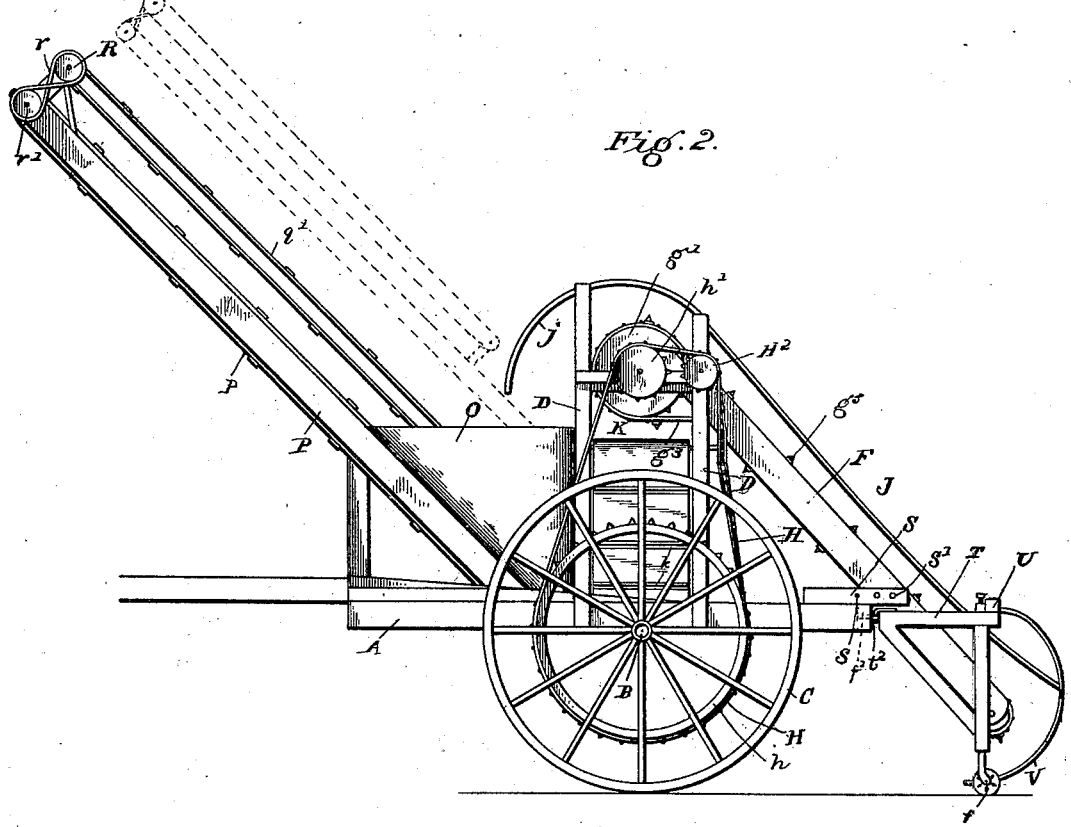
Figure 5:
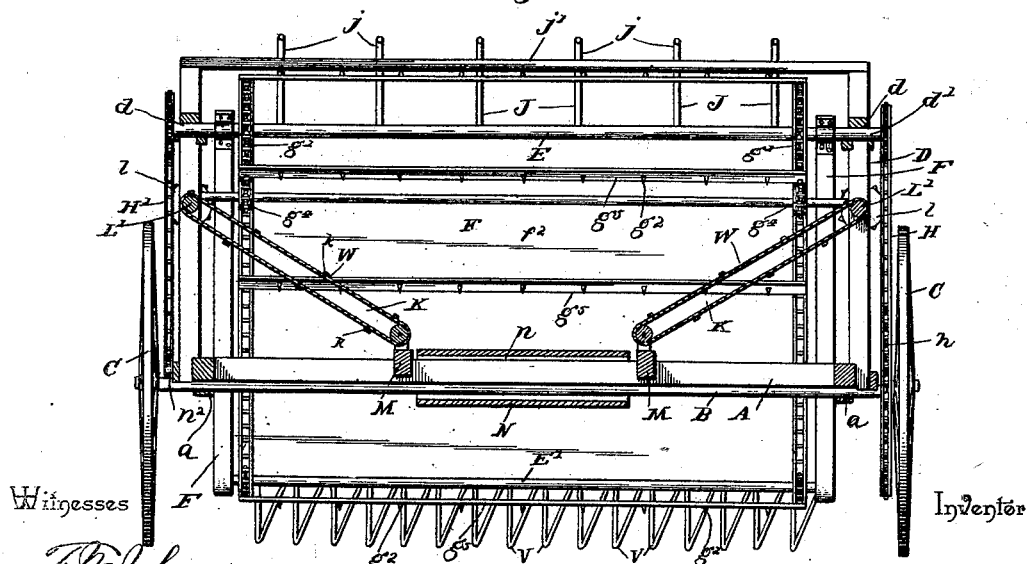
Figure 3:
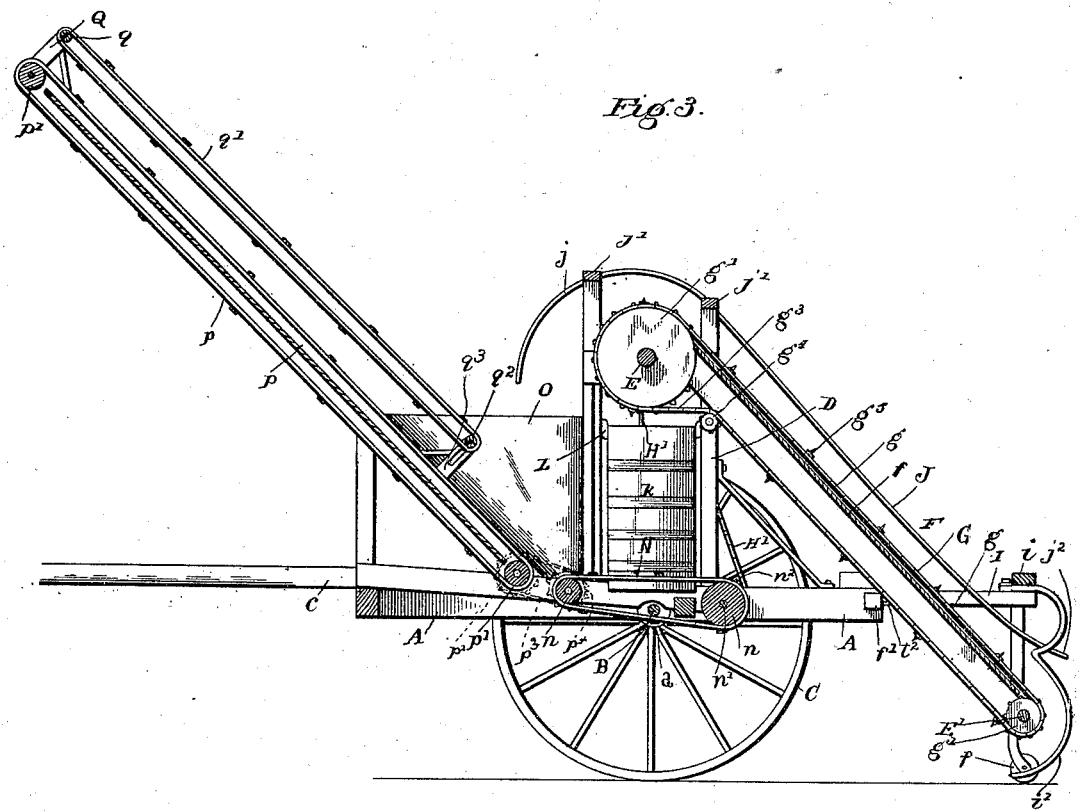
Figure 4:
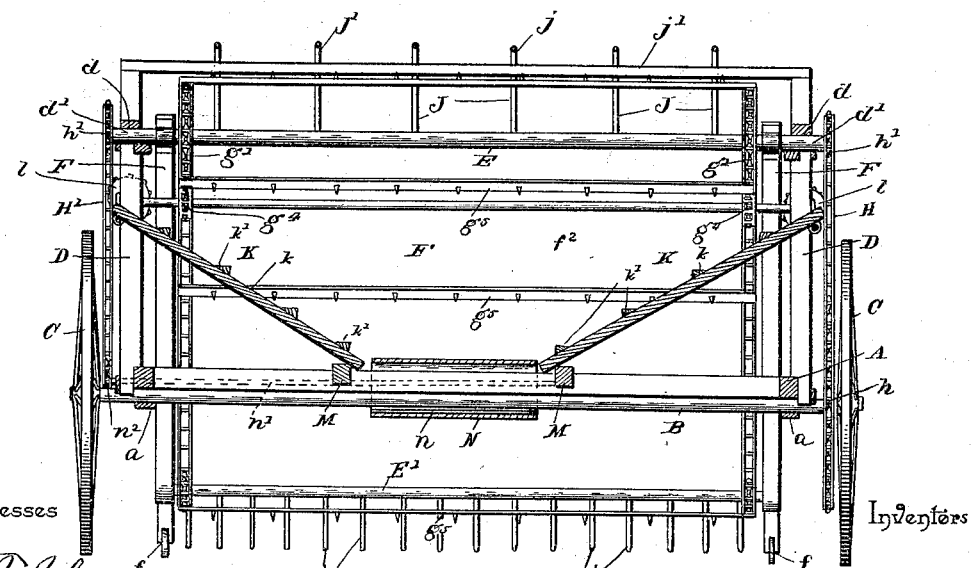

In the accompanying drawings:—Figure 1 is a perspective view of a hay loader constructed in accordance with our invention. Fig. 2 is a side elevation of the same showing the loader adapted for gathering the hay from a windrow, with the windrow attachment in position, as well as the endless inclined feeders or cross carriers used in connection with the windrow attachment. Fig. 3 is a central vertical longitudinal sectional view showing the loader as ordinarily employed, the construction as shown in Fig. 1 being followed. Fig. 4 is a central vertical transverse sectional view of the loader. Fig. 5 is a similar view showing the same as adapted for loading from windrows. Fig. 6 is a detail in perspective of the windrow rake attachment. Fig. 7 is a detail in perspective of a pair of the triangular apron teeth.

Referring to the accompanying drawings, A represents the axle balanced wheel frame, provided at a central point at opposite sides thereof with axle bearings $a$, which accommodate the single central supporting axle B, carrying at each end thereof the opposite wheels C, which form supports and travelers for the entire loader frame, which is attached to a hay wagon by means of the converging tongues $c$, in the ordinary manner, said tongues being secured at their inner ends to the top of the main frame A.

Arising from opposite sides of the main loader frame A, and directly above the supporting axle B, are the upright extension frames D, which frames carry upon the top thereof the bearings $d$, which receive the extended journal ends of the upper roller shaft $d'$, which carries an upper apron or carrier roller E, and which forms a pivotal support for the upper ends of the main carrier frame F. The main carrier frame F, which is thus pivotally supported from its upper end on the upper roller shaft $d'$, is, ordinarily, in gathering hay from the swath, free to move at its lower end, and has attached to the opposite lower ends thereof the supporting casters $f$, which travel freely over the surface of the ground, and allow the lower movable end of the main carrier to adjust itself to the unevennesses of the ground. The main carrier frame F, is of a width equaling that of the entire loader frame, and works between the opposite sides thereof, above the stop blocks $f'$, secured to opposite inner sides of the frame A, so that in case the tongue or front end of the loader frame were lowered, the said stop blocks would bear under opposite sides of the main carrier frame and lift the lower movable end thereof off of the ground. The main carrier frame F, is provided with the usual apron or carrier platform $f^2$, and at its lower end accommodates the lower apron roller E', over which and the upper apron roller E, passes the broad slat apron or carrier G. The broad slat apron or carrier G, comprises the opposite sprocket chains $g$, passing over the opposite pairs of sprocket wheels $g'$, on each of the apron rollers, and the transverse connecting slats $g^5$, to which are secured the triangularly shaped carrier teeth $g^2$. The triangular teeth $g^2$, are preferably cut in pairs from suitable sheet metal in order to provide for an easy attachment thereof to the apron slats, while at the same time permitting their bases to rest flat on the slats to dispose their apices in a straight line beyond the same. The endless apron or carrier G, is provided with an approximately horizontal portion $g^3$, disposed directly under the upper apron roller E, and is held in such position by means of the idler wheels $g^4$, secured to opposite inner sides of the frame F, so that as this portion of the apron or carrier travels in an approximately horizontal position directly under the upper apron roller, the triangular teeth $g^2$, will be disposed in a vertical position so as to drop the elevated hay onto the other feeding devices of the machine, which will be hereinafter more particularly referred to. Motion is communicated to the endless apron or carrier G, by means of the endless drive chain H, passing over the sprocket wheel $h$, secured to one end of the axle and the small chain wheel $h'$, at one end of the upper roller shaft $d'$, which carries a chain wheel at each end thereof. Detachably secured to opposite lower ends of the main carrier frame F, are the triangular rake supports I. The opposite rake supports I, are connected by the transverse rake head or bar $i$, to which are secured the upper ends of the 3-shaped rake teeth $i^2$. The 3-shaped rake teeth $i^2$, readily yield to the unevennesses of the ground, and serve, as the loader is carried along, to completely rake up or gather up the hay from the swath and direct it onto the lower end of the main carrier G, which elevates it over the upper apron roller E. The hay which is elevated by the main broad carrier G, is retained in position during elevation and prevented from blowing off by means of a parallel series of guard rods or wires J. The guard rods or wires J, are provided with upper curved ends $j$, which pass through perforations in the transverse rod supports $j'$, extending transversely above the upper ends of the extension frames D, and serve to direct the hay down between the opposite extension frames for the purpose to be presently described, while the lower ends of the rods or wires J, lie between the endless apron or carrier G, and the rake head, and at such ends are outwardly curved as at $j^2$, to take between the rake teeth and thereby assist in directing the hay onto the lower end of the apron or carrier, as will be readily understood, by those skilled in the art. Now it will be readily seen that as the hay is elevated by the main carrier, the same will be carried around the upper apron roller E, and directed onto the opposite inclined feeders K.

When the machine is used for loading from a swath, in connection with the rake attachment on the lower movable end of the main carrier, the inclined feeders K, are then the vibrating tossing boards $k$, as clearly shown in the drawings. The opposite inclined tossing boards $k$, are provided with transverse ribs $k'$, which as the said boards are in vibration, prevent the hay from slipping and direct it toward the center of the machine. The said inclined tossing boards $k$, are loosely mounted at their upper outer ends on the short crank shafts L. The crank shafts L, are journaled transversely at their ends in the opposite extension frames D, and carry at one end the chain wheels $l$, over which pass the sprocket chains H and H', the latter chain being arranged on the side of the machine opposite the chain H, and passing over one of the chain wheels $h'$, at one end of the upper roller shaft $d'$. At both sides of the loader, on both of the extension frames D, are journaled the idler guide wheels $H^2$, over which pass the chains H and H', and are so arranged as to dispose said chains in a position so as to lead the same over the sprocket driving the short crank shafts L. The inclined feeders which are described as tossing boards $k$, are disposed so as to have their inner ends move on the inner parallel frame pieces M, so that as the same are given a vibratory motion by means of the opposite crank shafts L, the hay which has been dropped thereon will be tossed onto the central short platform apron or carrier N. The short platform apron or carrier N, is arranged to travel over the apron rollers $n$, journaled on the inner parallel frame pieces M, and one of which is provided with an extended shaft portion $n'$, carrying at its outer extremity the chain wheel $n^2$, over which is arranged to pass the sprocket chain H', so as to communicate motion to the short platform apron or carrier N. The hay which is caused to drop onto the inclined feeders K, by reason of the horizontal disposition of the main carrier, is further directed onto said inclined feeders by means of the opposite curved guard plates O, which are disposed so as to prevent the hay from falling off at the sides of the inclined feeders, as well as to direct the same onto the short platform carrier N. The platform carrier serves to feed the hay onto the lower end of the inclined loader or delivery apron P. The inclined loader apron P, works through the inclined frame $p$, supported at the proper incline on the front end of the frame A, and carries at both ends thereof the apron rollers $p'$, the lower of which carries at one end thereof the short chain wheel $p^2$, over which passes the short chain $p^3$, to which motion is communicated from the chain wheel $p^4$, carried by one of the apron rollers $n$.

Arranged at the extreme upper end of the apron frames $p$, are the opposite off-standing supporting arms Q, in the upper ends of which are pivotally mounted the journal ends of the apron roller $q$, over which passes the auxiliary self-adjusting loader apron $q'$, the lower end of which passes over the lower movable apron roller $q^2$, the journal ends of which are arranged to move in the slotted guides $q^3$, secured to opposite sides of the frame $p$, above the lower end of the main loader apron P. The pivotal apron roller $q$, carries at one end the pulley R, which receives the crossed belt $r$, passing over a corresponding pulley $r'$, at one end of the upper one of the apron rollers $p'$. From the foregoing it will be readily seen that as the hay is delivered onto the lower end of the loader apron by the short platform carrier N, the upper auxiliary apron $q'$, will readily adjust itself to the quantity of grain being elevated, so as to assist in the elevation of the hay as well as to serve to retain it on the loader apron to prevent it from blowing off while being elevated into the hay wagon.

In gathering and loading dry hay, it will be readily apparent to those skilled in the art that the opposite inclined tossing boards may be turned over and left to stand stationary, so as to form plain slides for the hay to slide down onto the central platform carrier N, thus reducing the working parts of the machine.

The loader as herein described is particularly adapted for loading hay from the swath, but when it is desired to gather the hay from the windrows, the rake attachment on the lower end of the main carrier frame F, is removed, and such lower end of the main carrier frame held stationary between the opposite sides of the frame A, in rear of the wheel axle by means of the extension arms S, provided with a series of perforations s, to receive the clamping bolts s', passing therethrough and opposite sides of the frame F, to hold the same stationary in any set angle. When the main feeder frame is thus held stationary, as desired, we employ the independent pivoted rake frame T. The independent pivoted rake frame T, comprises the opposite triangular rake supports t, carrying at their pointed extremities the engaging hooks t', which are adapted to detachably engage the attaching eyes t², secured to the rear extremities of the opposite sides of the frame A, and providing a connection allowing the rake attachment a free up and down movement. The supports t, are connected by the rake bar or head U, to which are secured the upper ends of the V-shaped double rake teeth V, the apices of which gather up the hay and direct it onto the main carrier of the loader, the V-shape of said teeth preventing hay from slipping therebetween. When this windrow attachment is in position, the casters f, are removed from the lower ends of the frame F, and placed on the lower extremities of the rake supports t.

In connection with the windrow attachment, we employ different inclined feeders which, while serving the same function, as the tossing boards, are interchangeable therewith, being simply short endless inclined aprons or cross-carriers W, occupying the selfsame relative positions as the tossing boards occupy, but driven from a straight shaft L', arranged in the same position as the crank shafts L, and driven by the same connections. Thus it will be readily seen that to accommodate the loader to the work, the inclined feeders are changed to correspond with the changed rake attachments.

If so desired, the several interior feeding devices under the upper end of the main carrier may be dispensed with, and the loader apron arranged so as to have its lower inner end disposed directly under the upper end of the said main carrier G, as may be seen in dotted lines in one of the figures of the drawings, and we will also have it understood that any further changes in the form, proportion and the minor details of construction, as embraced within the scope of the appended claims, may be resorted to without departing from the principle or sacrificing any of the advantages of this invention.

Having thus described our invention, what we claim, and desire to secure by Letters Patent, is—

1. In a hay loader, the combination of a wheeled frame having opposite upright extensions at the opposite sides thereof, a shaft journaled on top of the upright extensions, a broad carrier frame pivoted at its upper end on said shaft and carrying supporting casters at its lower free end, the toothed apron mounted on the carrier frame and having a horizontal under portion located near its upper end, a rake attachment arranged at the lower end of the carrier frame, feeding devices mounted on the wheeled frame under the horizontal portion of the toothed apron, and an inclined loading or delivery apron arranged on the wheeled frame beyond said feeding devices, substantially as set forth.

2. In a hay loader, the combination of a balanced wheel supported frame, a main broad carrier frame pivotally hung at its upper end on the wheel supported frame leaving its other lower end free to move or to be adjusted, a rake attachment arranged at the lower end of said carrier frame, the endless carrier moving through said carrier frame, movable inclined feeders arranged at transversely opposite sides of the wheeled frame under the upper end of the broad carrier, a short platform carrier arranged between and under the inclined feeders, and an inclined loading or delivery apron leading from the short platform carrier, substantially as set forth.

3. In a hay loader, the combination of the balanced wheel supported frame having attaching eyes at the rear extremities of its opposite sides, a broad carrier frame pivotally supported at its upper end on the wheeled frame and free to be adjusted between the opposite sides thereof, a rake attachment frame having engaging hooks removably engaging the eyes of the wheeled frame, supporting casters, and carrying a series of rake teeth, feeding devices arranged under the pivoted end of the broad carrier frame and a loading or delivery apron arranged in advance of the broad carrier frame, substantially as set forth.

4. In a hay loader, the combination of the main broad carrier arranged at an incline and pivoted at its upper end, a short centrally disposed platform carrier arranged in advance of and under the delivering end of the broad carrier, opposite movable inclined feeders arranged to deliver onto the platform carrier, and a loading or delivery apron arranged in advance of said platform carrier, substantially as set forth.

5. In a hay loader, the combination with the inclined adjustable broad carrier and the loading or delivery apron arranged in advance thereof; of transversely opposite and independent inclined feeders arranged under the delivering end of the main broad carrier, a short platform apron arranged under the inner ends of the inclined feeders and delivering onto the loading or delivery apron, and opposite curved guard plates arranged at one side of the inclined feeders, substantially as set forth.

6. In a hay loader, the combination of the pivotally supported broad carrier having gathering devices at one end and provided with triangular carrier teeth and an approximately horizontal under portion near its upper end to dispose the teeth in a vertical plane, feeding devices arranged under said approximately horizontal portion, and a loading or delivery apron arranged in advance of said feeding devices, substantially as set forth.

7. In a hay loader, the combination with the spaced gathering and delivery aprons; of the short platform carrier arranged intermediate of said aprons, and transversely opposite vibrating ribbed tossing boards arranged at an angle under the delivering end of the gathering apron and feeding onto the said platform carrier, substantially as set forth.

In testimony that we claim the foregoing as our own we have hereto affixed our signatures in the presence of two witnesses.

JOHN L. McCREARY.
PARKER C. McCREARY.

Witnesses:
JACOB EPPSTEINER,
J. H. BRYAN.